(12) United States Patent
Radermacher

(10) Patent No.: US 8,466,627 B2
(45) Date of Patent: Jun. 18, 2013

(54) DEVICE WITH LIGHT-EMITTING DIODE CIRCUITS

(75) Inventor: Harald Josef Gunther Radermacher, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 228 days.

(21) Appl. No.: 13/055,517

(22) PCT Filed: Jul. 22, 2009

(86) PCT No.: PCT/IB2009/053178
§ 371 (c)(1),
(2), (4) Date: Jan. 24, 2011

(87) PCT Pub. No.: WO2010/013173
PCT Pub. Date: Feb. 4, 2010

(65) Prior Publication Data
US 2011/0115389 A1   May 19, 2011

(30) Foreign Application Priority Data

Jul. 30, 2008  (EP) .................................... 08104922

(51) Int. Cl.
*H05B 37/02*  (2006.01)
(52) U.S. Cl.
USPC .......................................... 315/194; 323/212
(58) Field of Classification Search
USPC ...... 315/185 R, 194, 246, 250, 251; 323/212, 323/364
See application file for complete search history.

(56) References Cited

U.S. PATENT DOCUMENTS

| | | | | |
|---|---|---|---|---|
| 6,069,452 A * | 5/2000 | Rossner | ......................... | 315/192 |
| 6,288,497 B1 * | 9/2001 | Chang et al. | .............. | 315/185 R |
| 6,636,027 B1 * | 10/2003 | Nerone | .......................... | 323/364 |
| 6,853,150 B2 * | 2/2005 | Clauberg et al. | .......... | 315/185 R |
| 7,053,560 B1 * | 5/2006 | Ng | .............................. | 315/185 R |
| 7,847,487 B2 * | 12/2010 | Kato | .............................. | 315/192 |
| 7,931,390 B2 * | 4/2011 | Allen et al. | .................... | 362/255 |

FOREIGN PATENT DOCUMENTS

| | | |
|---|---|---|
| CN | 200968516 Y | 10/2007 |
| EP | 0695112 A1 | 1/1996 |
| WO | 2005120134 A1 | 12/2005 |

* cited by examiner

*Primary Examiner* — Thuy Vinh Tran
(74) *Attorney, Agent, or Firm* — Mark L. Beloborodov

(57) ABSTRACT

Devices (1) have branches (20,30) for receiving AC voltages. First branches (20) comprise first light-emitting diode circuits (21) and first arrangements for phase-shifting first currents flowing through the first light-emitting diode circuits (21) with respect to the AC voltages. Second branches (30) comprise second light-emitting diode circuits (31) and do not comprise second arrangements for phase-shifting second currents flowing through the second light-emitting diode circuits (31) with respect to the AC voltages. As a result, an overall flicker index of the device (1) will be smaller than individual flicker indices of the light-emitting diode circuits (21,31). The first arrangements may comprise capacitors (22) coupled serially to the first light-emitting diode circuits (21). The branches (20,30) may further comprise resistors (23,33) coupled serially to or forming part of the light-emitting diode circuits (21,31). The light-emitting diode circuits (21,31) generate light in response to positive and negative halves of the AC voltages.

15 Claims, 5 Drawing Sheets

DEVICE WITH LIGHT-EMITTING DIODE CIRCUITS

FIELD OF THE INVENTION

The invention relates to a device comprising light-emitting diode circuits, and to a method for feeding light-emitting diode circuits in a device.

Examples of such a device are lamps comprising alternating current light-emitting diodes or ACLEDs.

BACKGROUND OF THE INVENTION

WO 2005/120134 discloses a circuit comprising two anti-parallel connected light-emitting diodes in a first branch and two anti-parallel connected light-emitting diodes in a second branch. The first and second branches are parallel branches. The first branch further comprises a capacitor and is a capacitive branch. The second branch further comprises a coil and is an inductive branch. As a result, light changes of the anti-parallel light-emitting diode pairs take place at different points in time and, as compared to individual flicker indices of the anti-parallel light-emitting diode pairs, an overall flicker index of the circuit is reduced.

OBJECT AND SUMMARY OF THE INVENTION

It is an object of the invention to provide an improved device. It is a further object of the invention to provide an improved method.

According to a first aspect of the invention, a device comprises light-emitting diode circuits with at least first and second branches for receiving an AC voltage, wherein the first branch comprises a first light-emitting diode circuit as well as a first arrangement for phase-shifting a first current flowing through the first light-emitting diode circuit with respect to the AC voltage, and the second branch comprises a second light-emitting diode circuit and does not comprise a second arrangement for phase-shifting a second current flowing through the second light-emitting diode circuit with respect to the AC voltage.

A simple and low-cost, robust device is created by phase-shifting a first current flowing through the first light-emitting diode circuit with respect to the AC voltage, and by not phase-shifting a second current flowing through the second light-emitting diode circuit with respect to the AC voltage.

A light-emitting diode circuit comprises one or more light-emitting diodes, (in)organic light-emitting diodes and/or laser light-emitting diodes.

The first and second branches may be parallel branches and/or branches powered from the same secondary winding or from different secondary windings of a transformer. Each branch may further comprise one or more other components such as a relay, a switch, a fuse, etc.

In an embodiment of the device according to the invention, the first arrangement comprises a capacitor coupled serially to the first light-emitting diode circuit. Use of a capacitor for phase-shifting a current is advantageous as compared to using a coil, because the capacitor has a smaller size. In addition, the first arrangement may further comprise one or more other capacitors and/or one or more resistors.

In another embodiment of the device according to the invention, the capacitor is controllable. Said controllability may comprise, for example, changing the physical properties, such as size, distance, etc. of the capacitor and/or may have a dedicated control input and/or several capacitors of different size and selection means, e.g. a second capacitor, which can be connected in parallel or in series with the first capacitor by means of one or more controllable switches, and/or may comprise applying a control voltage across the capacitor by means of a suitable decoupling network so as to advantageously adjust the capacitive current phase angles, e.g. to optimize the power factor of complete lamp systems. The controllability of the capacitor can be utilized e.g. during production of the devices (e.g. laser trimming of the capacitor size), during production of luminaries consisting of one or more devices, or during operation so as to achieve a desired operating point.

In a further embodiment of the device according to the invention, the respective first and second branches further comprise respective first and second resistors coupled serially to or forming part of the respective first and second light-emitting diode circuits. The respective first and second resistors may be located either outside or inside the respective first and second light-emitting diode circuits. When located outside the respective first and second light-emitting diode circuits, the first resistor may be located between the capacitor and the first light-emitting diode circuit, or the capacitor may be located between the first resistor and the first light-emitting diode circuit, or the first light-emitting diode circuit may be located between the capacitor and the first resistor. When located inside the respective first and second light-emitting diode circuits, the resistors may be external or internal resistors realized by properly selecting and/or coupling the light-emitting diodes. In addition, each branch may further comprise one or more other resistors.

In a further embodiment of the device according to the invention, one or more of the first and second resistors is controllable. Said controllability may comprise, for example, changing the physical properties, such as length, width, etc. of the resistor and/or may have a dedicated control input and/or several resistors of different size and selection means, e.g. a third resistor, which can be connected in parallel or in series with the first or second resistor by means of controllable switch(es), and/or may comprise applying a control voltage across the resistor by means of a suitable decoupling network so as to advantageously adjust the capacitive current phase angles, e.g. to optimize the power factor of complete lamp systems. The controllability of the resistor can be utilized e.g. during production of the devices (e.g. laser trimming of the resistor width), during production of luminaries consisting of one or more devices or during operation so as to achieve a desired operating point.

In a further embodiment of the device according to the invention, one or more of the first and second light-emitting diode circuits is controllable. Said controllability may comprise, for example, adjusting the wiring of the light-emitting diode circuit by means of laser trimming, etc.

In a further embodiment of the device according to the invention, at least one of the light-emitting diode circuits is capable of generating light in response to at least a part of a positive half of the AC voltage as well as in response to at least a part of a negative half of the AC voltage. Such a light-emitting diode circuit is preferably to be used when being fed with an AC voltage.

In a further embodiment of the device according to the invention, at least one of the light-emitting diode circuits has substantially similar impedance values for both halves of the AC voltage. Such a light-emitting diode circuit is preferably to be used when an overall flicker index of the device is to be reduced as compared with individual flicker indices of the light-emitting diode circuits. The flicker index is related to, for example, the optical flicker index in the emitted light in accordance with the IESNA calculation method.

In a further embodiment of the device according to the invention, at least one of the light-emitting diode circuits comprises two anti-parallel strings each consisting of one or more light-emitting diodes.

In a further embodiment of the device according to the invention, at least one of the light-emitting diode circuits comprises a rectifier coupled serially to a string of one or more light-emitting diodes.

In a further embodiment, the device is an AC voltage lamp comprising a light source, the first and second light-emitting diode circuits jointly constituting the light source.

In a further embodiment of the device according to the invention, the respective first and second light-emitting diode circuits generate light with respective first and second flicker indices, and the light source generates light with an overall flicker index which is smaller than each one of the first and second flicker indices.

In a further embodiment of the device according to the invention, a sum of the first and second currents is a total current, the total current having a reduced third harmonic as compared to each one of the first and second currents. A reduction of the third harmonic of the total current supplied by an AC voltage source is a great advantage in striving for compliance with mains harmonics regulations.

In a further embodiment of the device according to the invention, each phase-shifting corresponds to an introduction of a phase shift of at least five degrees. In the first branch, the first current flowing through the first light-emitting diode circuit is thus shifted by at least five degrees (preferably more than five degrees, such as twenty degrees or more) with respect to the AC voltage, and in the second branch, the second current flowing through the second light-emitting diode circuit is shifted by at most five degrees (preferably less than five degrees, such as one degree or less) with respect to the AC voltage.

According to a second aspect of the invention, a method of feeding light-emitting diode circuits in a device with at least first and second branches for receiving an AC voltage is provided, wherein the first branch comprises a first light-emitting diode circuit, and the second branch comprises a second light-emitting diode circuit, the method comprising the steps of phase-shifting, in the first branch, a first current flowing through the first light-emitting diode circuit with respect to the AC voltage, and not phase-shifting, in the second branch, a second current flowing through the second light-emitting diode circuit with respect to the AC voltage.

Embodiments of the method correspond to the embodiments of the device.

The invention is based on the recognition that currents in different branches need to have different phase shifts and that, in only one of two branches, a current needs to be phase-shifted with respect to an AC voltage.

The invention provides an improved device which is simple, low cost and robust.

These and other aspects of the invention are apparent from and will be elucidated with reference to the embodiments described hereinafter.

DESCRIPTION OF EMBODIMENTS

Figure 1:
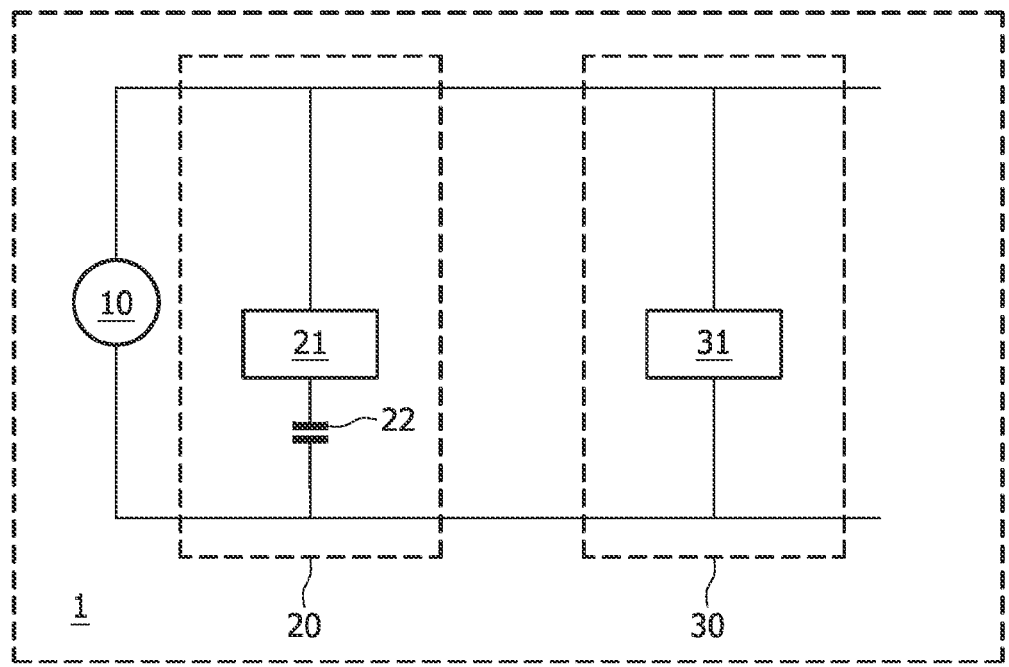
FIG. 1 shows a device with two branches.

FIG. 1 shows a device 1 with two branches 20,30. A first branch 20 comprises a first light-emitting diode circuit 21 and a capacitor 22 coupled serially to the first light-emitting diode circuit 21. A second branch 30 comprises a second light-emitting diode circuit 31. Both branches 20,30 receive an AC voltage from a voltage source 10. The capacitor 22 is an example of a first arrangement for phase-shifting a first current flowing through the first light-emitting diode circuit 21 with respect to the AC voltage. The second branch 30 does not comprise a second arrangement for phase-shifting a second current flowing through the second light-emitting diode circuit 31 with respect to the AC voltage. As a result, an overall current supplied by the voltage source 10 is smoothed.

Figure 2:
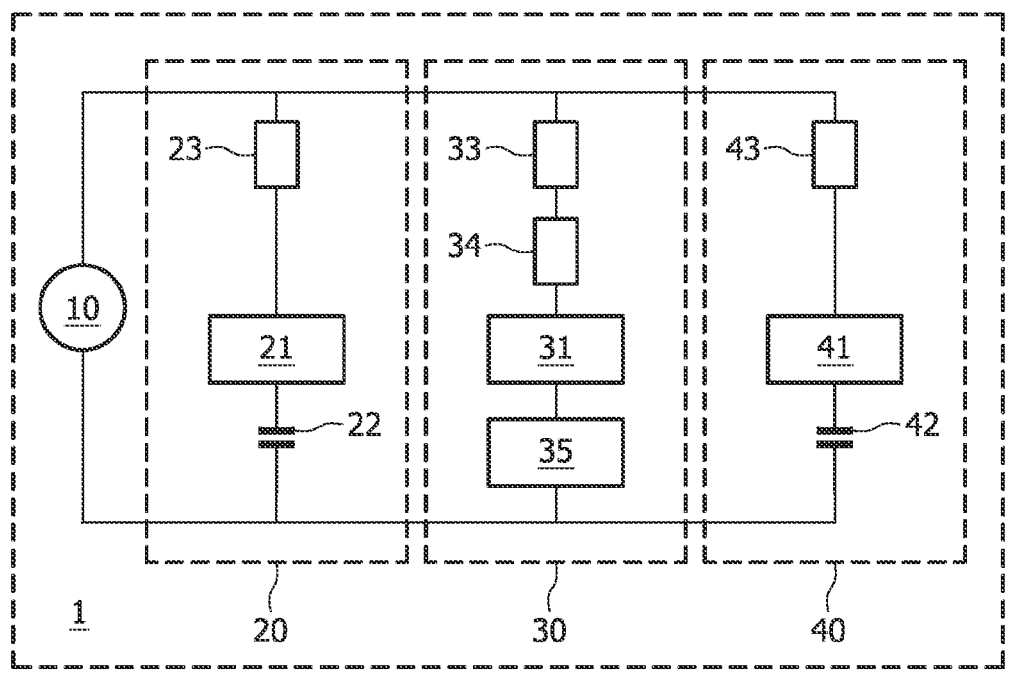
FIG. 2 shows a device with three branches.

FIG. 2 shows a device 1 with three branches 20,30,40. A first branch 20 comprises a serial connection of a first light-emitting diode circuit 21, a capacitor 22 and a first resistor 23. A second branch 30 comprises a serial connection of a second light-emitting diode circuit 31, a further light-emitting diode circuit 35, a second resistor 33 and a further resistor 34. A third branch 40 comprises a serial connection of a third light-emitting diode circuit 41, a further capacitor 42 and a third resistor 43.

Figure 3:
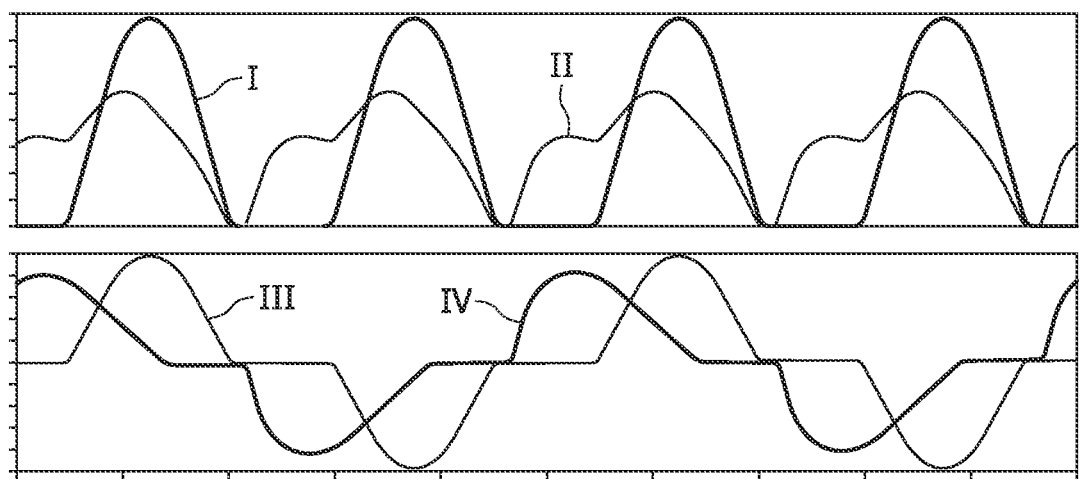
FIG. 3 shows current waveforms.

FIG. 3 shows current waveforms I-IV (in FIG. 2, current versus time). The waveforms II-IV represent a result based on the proposed device. The current waveform III represents a current flowing through the second branch 30. The current waveform IV represents a current flowing through the first or third branch 20 or 40. The current waveform II represents an absolute value of an overall current. As a first-order approximation, the total flux emitted by the device is proportional to this current. Hence, the waveform II also depicts the flux. For reference, the situation in a possible lamp which is not based on the proposed device is shown as waveform I. Here, all light-emitting diode circuits are driven from a non-phase-shifted current. During a zero crossing of a supply voltage, there is a long period of time when all light-emitting diode circuits are completely off. In contrast to this, the waveform II for the proposed circuit has a shorter dark period (where the flux is zero) while incorporating the same total flux as for the waveform I. Clearly, the overall current and flux in the proposed device (waveform II) are smoother. Hence, it produces less flicker.

Figure 4:
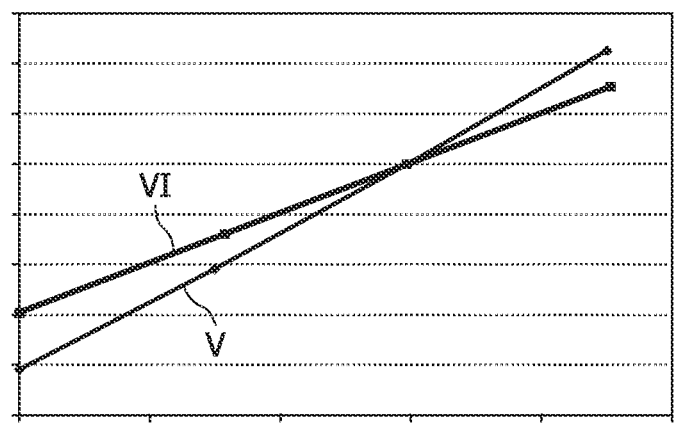
FIG. 4 shows a flux-versus-voltage function.

FIG. 4 shows a flux-versus-voltage function (relative flux versus voltage, crossing point: relative flux "1" and nominal supply voltage). A graph V represents a normal operation (no phase-shifted currents) and a graph VI represents a more stable operation resulting from an introduction of the capacitor 22 into the device 1. The proposed device does not only reduce the flicker, it also improves the stability of the total flux-versus-supply voltage changes. In case the lamp is operated from the mains grid, changes in the mains voltage will have a less pronounced effect on the total flux emitted by the lamp.

Figure 5:
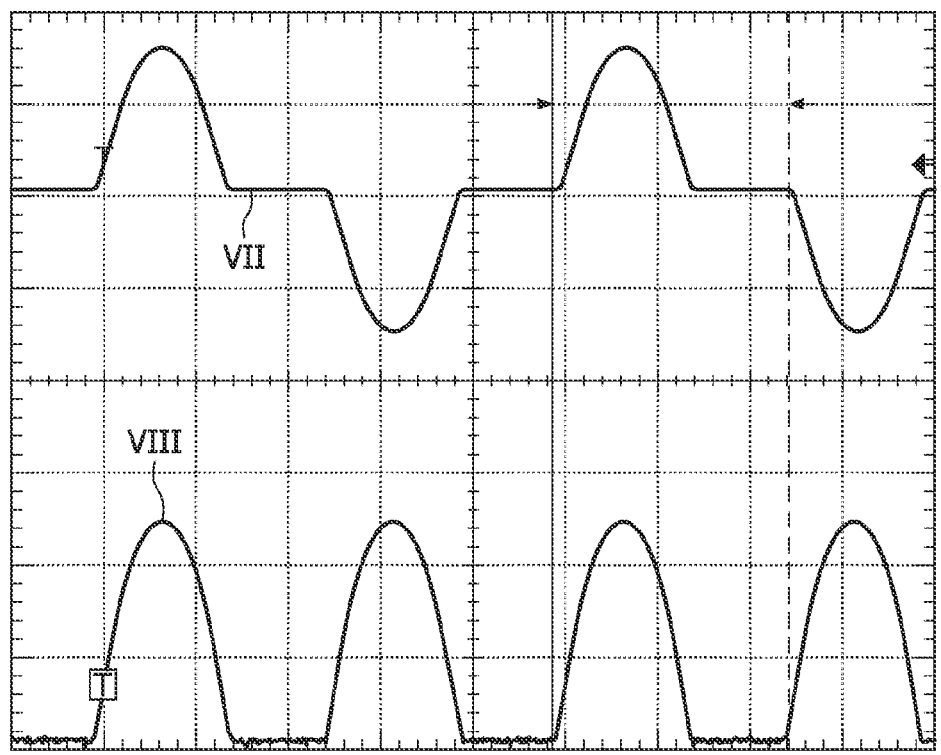
FIG. 5 shows a measured waveform and a flux of a light-emitting diode circuit under normal operation.

FIG. 5 shows a measured waveform VII and a flux VIII of a light-emitting diode circuit under normal operation (no phase-shifted currents). The flux VIII has nearly the same shape as the waveform I in FIG. 3. Therefore, the measurements prove the assumption made in the description of FIG. 3. The resulting flicker index is 0.48 (current and flux, both versus time).

Figure 6:
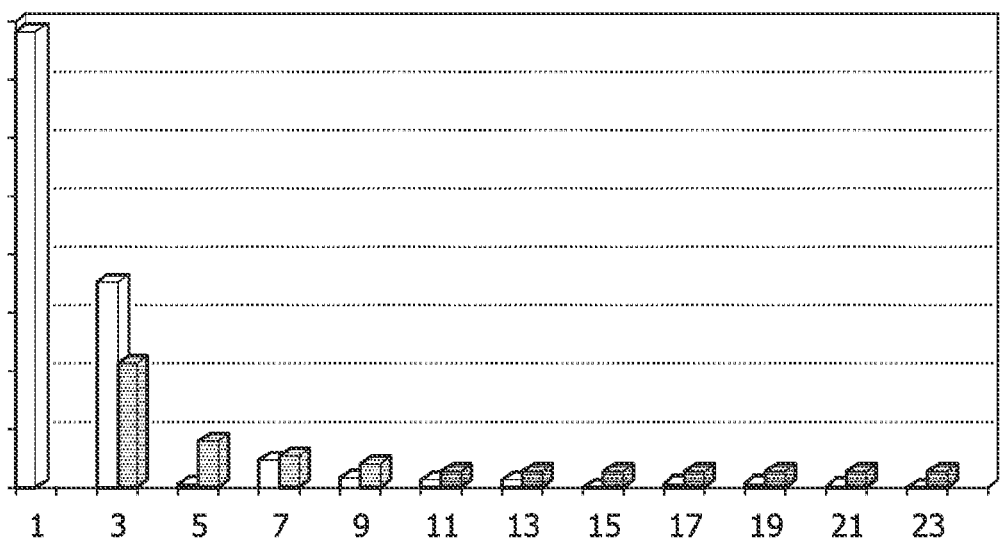
FIG. 6 shows harmonics for the FIG. 5 light-emitting diode circuit under normal operation.

FIG. 6 shows harmonics for the FIG. 5 light-emitting diode circuit under normal operation (no phase-shifted currents). For the limit value, shown in the dark blocks, it is assumed that the lamp is operated directly from the mains voltage, which is one possible embodiment. For the third harmonic, the amplitude of this third harmonic (light block) for the light-emitting diode circuit under normal operation (no shifted currents) is clearly larger than an allowed amplitude for this third harmonic (dark block) according to the harmonics limits for mains-operated light sources. The light-emitting diode circuit would therefore not be compliant with the mains harmonics regulations currently valid in, for example, Europe, when having a power above 25 Watt.

Figure 7:
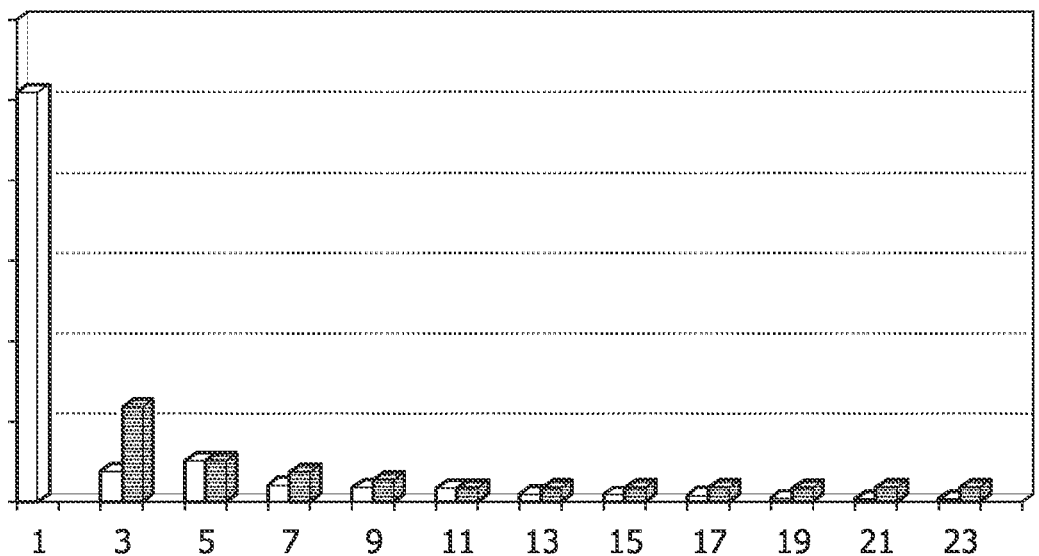
FIG. 7 shows harmonics for a device comprising an arrangement for phase-shifting a current.

FIG. 7 shows harmonics for a device comprising an arrangement for phase-shifting a current. For the third harmonic, the amplitude of this third harmonic (light block) for the light-emitting diode circuit in combination with the added capacitor or capacitors is now clearly smaller than an allowed amplitude for this third harmonic (dark block). The light-emitting diode circuit in combination with the added capacitor or capacitors is therefore compliant with the mains harmonics regulations currently valid in, for example, Europe.

Figure 8:
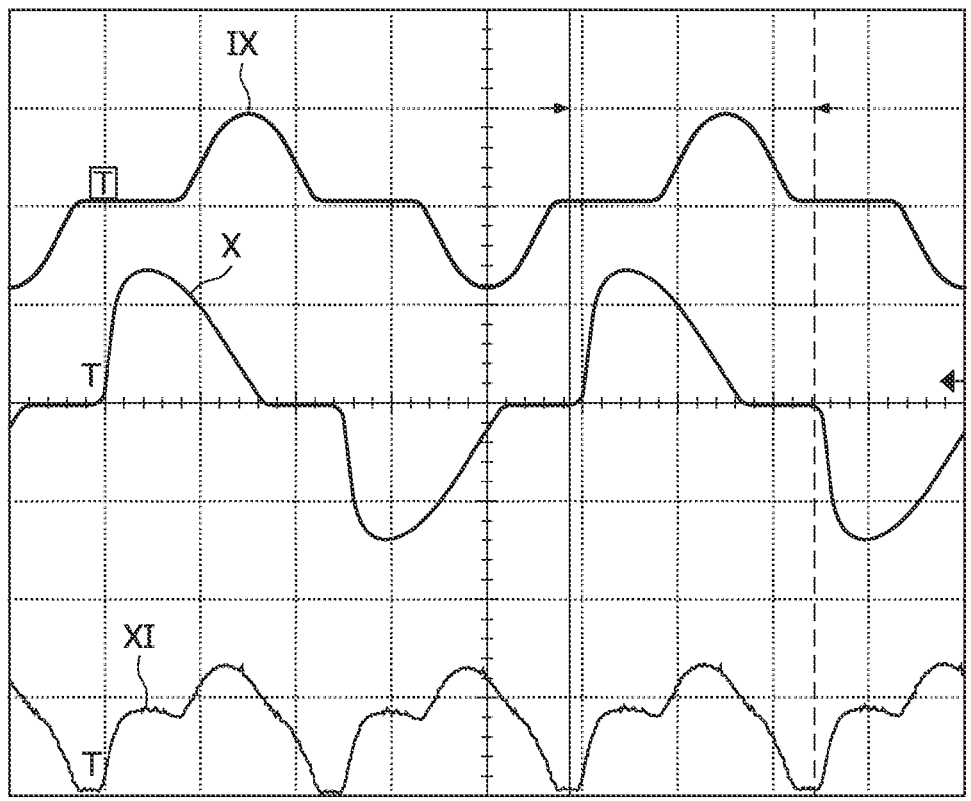
FIG. 8 shows two current waveforms and a flux for a test set-up.

FIG. 8 shows two current waveforms and a flux for a test set-up. The test set-up comprises twenty light-emitting diodes, ten with a resistive ballast and ten with a resistive and capacitive ballast. A waveform IX represents a current flowing through a light-emitting diode with a resistive ballast. A waveform X represents a current flowing through a light-emitting diode with a resistive and capacitive ballast. A graph XI represents a resulting light flux (flicker index 0.20—improvement by a factor of 2.4 as compared to the value of 0.48 in the normal set-up). Again, the measurement result of the flux matches the simulation result quite well, which is shown as waveform II in FIG. 3. Of course, the power levels of the real set-up and the simulation are not identical, but this results in a different scaling of the axis.

Figure 9:
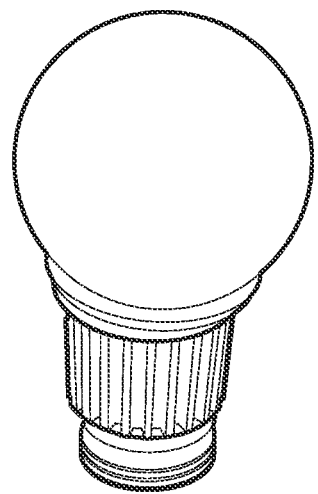
FIG. 9 shows a lamp.

FIG. 9 shows a lamp. This is, for example, an AC voltage retrofit lamp comprising a light source. The device 1 shown in FIG. 1 is present below the diffuse cap, be it with some resistors as shown in FIG. 2. The light-emitting diode circuits jointly constitute the light source. Each light-emitting diode circuit has a flicker index under normal operation. With arrangements added to only some of the light-emitting diode circuits for shifting currents flowing through each of them that include the arrangements, the light source will have an overall flicker index which is smaller than the flicker index of the light-emitting diode circuits under normal operation. When two or more lamps are present, they may have similar first (second) branches or different first (second) branches, and similar or different numbers of branches.

Figure 10:
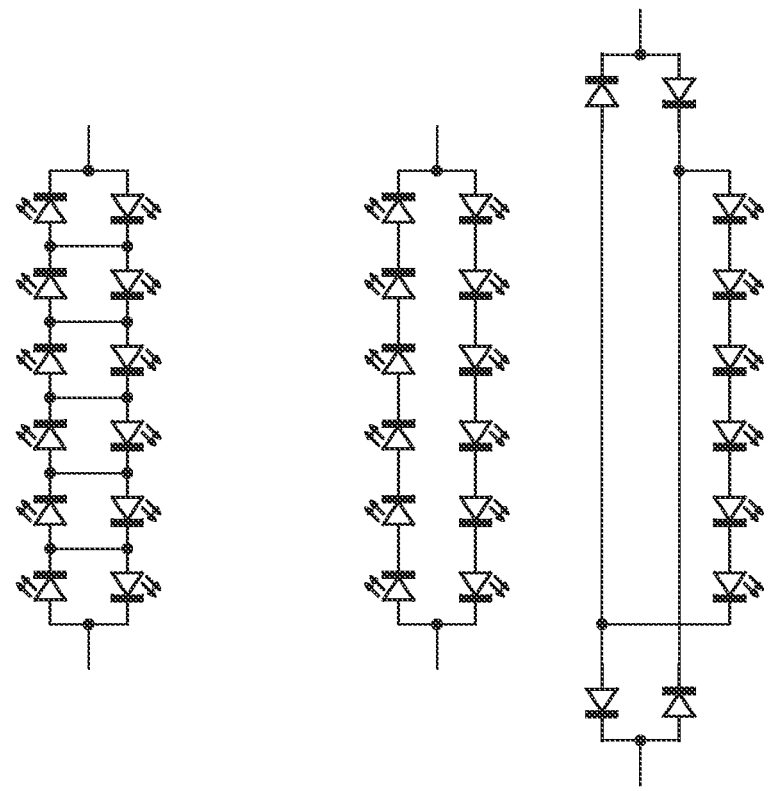
FIG. 10 shows possible implementations of a light-emitting diode circuit.

FIG. 10 shows possible implementations of one light-emitting diode circuit. The left-hand part of the Figure shows a first possible implementation of a light-emitting diode circuit comprising twelve light-emitting diodes. One pair comprises two anti-parallel light-emitting diodes, and six pairs are coupled serially to each other. The middle part of the Figure shows a second possible implementation of a light-emitting diode circuit comprising twelve light-emitting diodes. One string comprises six serially coupled light-emitting diodes, and two strings are coupled in an anti-parallel way. The right-hand part of the Figure shows a third possible implementation of a light-emitting diode circuit comprising six light-emitting diodes. One string comprises six serially coupled light-emitting diodes, and the string is coupled to a four-diode rectifier bridge.

One or more pieces of the device 1 may be monolithically integrated on one or more pieces of semi-conductive material or another type of material, different numbers of junctions may be present in one package or in different packages, and many other different embodiments and implementations are not to be excluded. One or more pieces of the device 1 may be integrated with one or more other pieces of the device 1. One or more pieces of the device 1 may comprise one or more parasitic elements and/or may be based on a presence of these one or more parasitic elements. The AC voltage may be 110 Volt, 220 Volt, 12 Volt or any other type of AC voltage.

The actual waveform and hence the flux of a light-emitting diode circuit is determined by a selection of the light-emitting diode circuit, a selection of a voltage frequency of a waveform of the AC voltage and/or a selection of a capacitor and/or a resistor coupled to this light-emitting diode circuit. These selections determine the harmonics generated by the device and all of this therefore has to be taken into account when designing a device that has to be in compliance with mains harmonics regulations.

In a device, an arrangement may be adjustable to a desired phase-shifting degree, a capacitor may be adjustable to a desired capacitance value, a resistor may be adjustable to a desired resistance value, and a light-emitting diode circuit may be adjustable to a desired light-emitting diode circuitry value. In a method, a step may comprise an adjustment of a controllable element (an arrangement, a capacitor, a resistor, a light-emitting diode circuit) of the device in order to achieve a desired operating point, during production/assembly and/or during operation.

In summary, devices 1 have branches 20,30 for receiving AC voltages. First branches 20 comprise first light-emitting diode circuits 21 and first arrangements for phase-shifting first currents flowing through the first light-emitting diode circuits 21 with respect to the AC voltages. Second branches 30 comprise second light-emitting diode circuits 31 and do not comprise second arrangements for phase-shifting second currents flowing through the second light-emitting diode circuits 31 with respect to the AC voltages. As a result, an overall flicker index of the device 1 will be smaller than individual flicker indices of the light-emitting diode circuits 21,31. The first arrangements may comprise capacitors 22 coupled serially to the first light-emitting diode circuits 21. The branches 20,30 may further comprise resistors 23,33 coupled serially to or forming part of the light-emitting diode circuits 21,31. The light-emitting diode circuits 21,31 generate light in response to positive and negative halves of the AC voltages.

While the invention has been illustrated and described in detail in the drawings and the foregoing description, such an illustration and description are to be considered illustrative or as examples, and are not restrictive; the invention is not limited to the disclosed embodiments. For example, it is possible to operate the invention in an embodiment wherein different parts of the different disclosed embodiments are combined to a new embodiment.

Other variations of the disclosed embodiments can be understood and effected by those skilled in the art in practicing the claimed invention, from a study of the drawings, the disclosure, and the appended claims. In the claims, use of the verb "comprise" and its conjugations does not exclude other elements or steps, and the indefinite article "a" or "an" does not exclude a plurality. The mere fact that certain measures are recited in mutually different dependent claims does not indicate that a combination of these measures cannot be used

The invention claimed is:

1. A device comprising light-emitting diode circuits with at least first and second branches for receiving an AC voltage, wherein the first branch (20) comprises a first light-emitting diode circuit and a first arrangement for phase-shifting a first current flowing through the first light-emitting diode circuit with respect to the AC voltage, and the second branch comprises a second light-emitting diode circuit and does not comprise a second arrangement for phase-shifting a second current flowing through the second light-emitting diode circuit with respect to the AC voltage.

2. The device as claimed in claim 1, wherein the first arrangement comprises a capacitor coupled serially to the first light-emitting diode circuit.

3. The device as claimed in claim 2, wherein the capacitor is controllable.

4. The device as claimed in claim 2, wherein the first and second branches (20,30) further comprise respective first and second resistors (23,33) coupled serially to or forming part of the respective first and second light-emitting diode circuits.

5. The device as claimed in claim 4, wherein the first and second resistors (23,33) are controllable.

6. The device as claimed in claim 1, wherein the first and second light-emitting diode circuits are controllable.

7. The device as claimed in claim 1, wherein at least one of the light-emitting diode circuits is capable of generating light in response to at least a part of a positive half of the AC voltage as well as in response to at least a part of a negative half of the AC voltage.

8. The device as claimed in claim 1, wherein at least one of the light-emitting diode circuits has substantially similar impedance values for both halves of the AC voltage.

9. The device as claimed in claim 1, wherein at least one of the light-emitting diode circuits comprises two anti-parallel strings each comprising one or more light-emitting diodes.

10. The device as claimed in claim 1, wherein at least one of the light-emitting diode circuits comprises a rectifier coupled serially to a string of one or more light-emitting diodes.

11. The device as claimed in claim 1, wherein the device is an AC voltage lamp comprising a light source, the first and second light-emitting diode circuits jointly constituting said light source.

12. The device as claimed in claim 11, wherein the first and second light-emitting diode circuits generate light with respective first and second flicker indices, and the light source generates light with an overall flicker index which is smaller than each one of the first and second flicker indices.

13. The device as claimed in claim 1, wherein a sum of the first and second currents is a total current, the total current having a reduced third harmonic as compared to each one of the first and second currents.

14. The device as claimed in claim 1, wherein each phase-shifting corresponds to an introduction of a phase shift of at least five degrees.

15. A method comprising providing a device, wherein the device has at least first and second branches (20,30) for receiving an AC voltage, wherein the first branch (20) comprises a first light-emitting diode circuit, and the second branch comprises a second light-emitting diode circuit, the method further comprising the steps of phase-shifting, in the first branch (20), a first current flowing through the first light-emitting diode circuit with respect to the AC voltage, and not phase-shifting, in the second branch, a second current flowing through the second light-emitting diode circuit with respect to the AC voltage.

* * * * *